United States Patent Office 2,792,215
Patented May 14, 1957

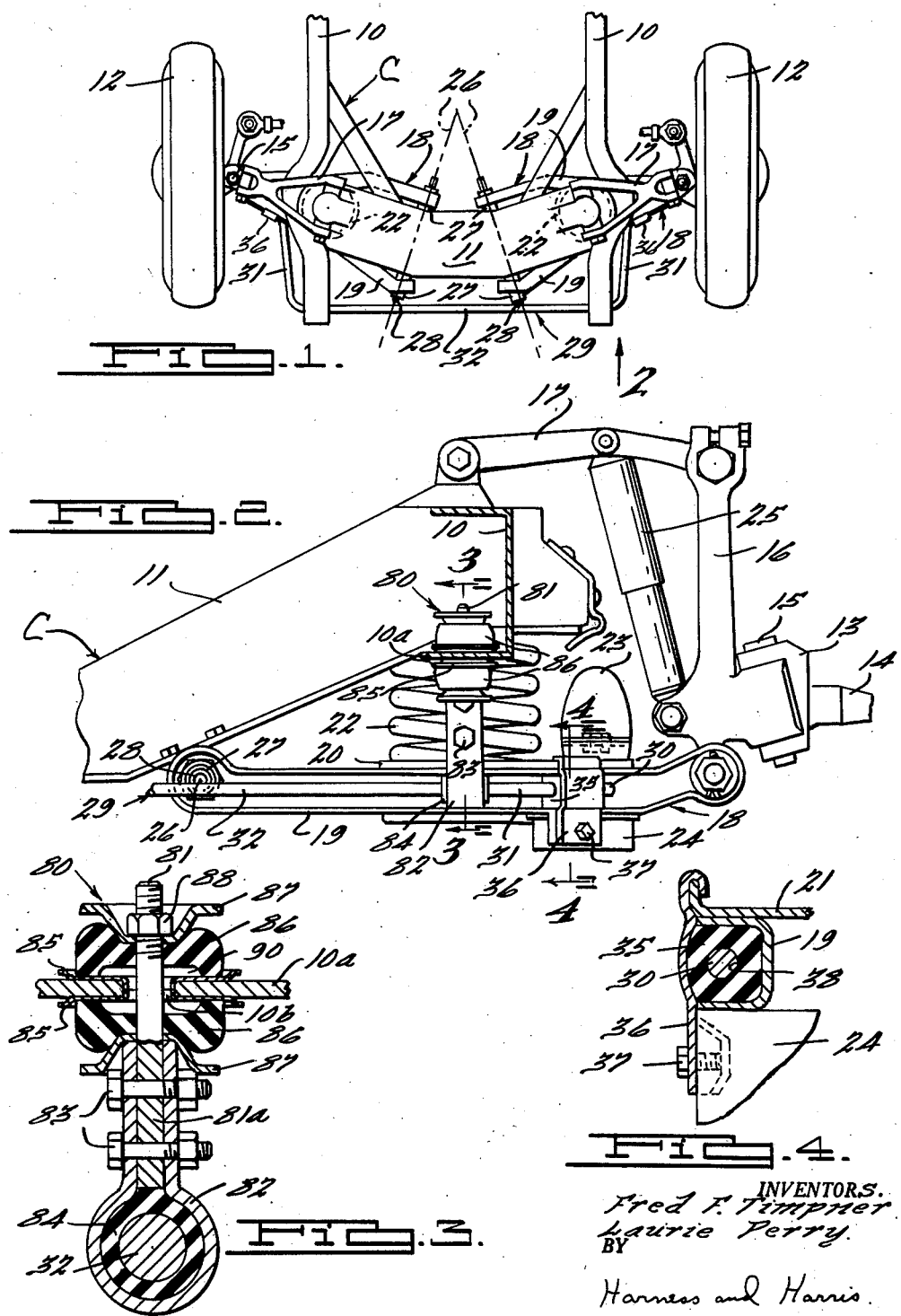

2,792,215

FREE PLAY STABILIZER MOUNTING

Fred F. Timpner, Birmingham, and Laurie Perry, Utica, Mich., assignors to Chrysler Corporation, Highland Park, Mich., a corporation of Delaware Application October 14, 1954, Serial No. 462,134

6 Claims. (Cl. 267—11)

This invention relates to motor vehicles having a pair of independently sprung wheels and more particularly to improvements in stabilizing antisway bar devices associated with the independently sprung wheels.

An object of the invention is the provision of an improved, simple, economical, and efficient stabilizer or antisway device arranged in a novel operative relationship with independently sprung road wheels so as to initially provide a degree of substantially free-play wheel movement of the wheel suspension in a vertical direction prior to bringing the full effects of the stabilizing device into operation.

A further object of the invention is the provision of an improved free-play connection between a stabilizing bar and the associated frame that provides the reaction means for the stabilizing bar so that road disturbances will not be directly transmitted to the sprung frame.

More particularly this invention respects a bowed bar constituting the stabilizer which bar has opposite end portions respectively connected to pivotally mounted wheel suspension control arms for movement therewith, said bar having portions intermediate said end portions mounted on free-play connections and adapted to resist relative oscillation of the suspension control arms by torsional stress thereof.

It is another object of this invention to provide a free-play hanger for connecting a torsion type sway bar to a frame member in a manner that will tend to damp out road disturbances and insulate against the transmission of noise by the stabilizer.

Still another object of this invention is the novel connection of the sway bar and the associated suspension control arms to the supported frame by means of resilient elements that not only insulate the connected elements but which are so formed that they provide an initial degree of relatively free movement of the control arms in a vertical direction before the antisway control effects of the stabilizing bar are brought into operation. This provides improved straightaway ride characteristics of the vehicle body while still retaining the desired antisway properties of the sway bar for counteracting roll on curves or the like.

In the application of sway bars to independently sprung wheel suspensions for the purpose of increasing the resistance to body roll on curves, it has been common practice to connect the sway bar to the wheel suspension control arms and to the sprung chassis frame through pre-compressed resilient blocks that substantially prevent any relative movement between the sway bar and its connected elements. This arrangement resists any independent relative movement between the wheels and the sprung mass with the result that the actual deflection rate of the suspension for independent wheel movement on encountering road irregularities during substantially straight road travel is very considerably increased over the deflection rate of the suspension spring alone. The result is that the sway bar tends to transmit more disturbance to the vehicle body and frame than would be the case if the sway bar were omitted. It is the purpose of the sway bar arrangement herein disclosed to reduce the sway bar transmitted disturbances to a minimum by providing a sway bar mounting that gives a limited amount of free wheel motion during which time the sway bar will be inactive while retaining the full effectiveness of the sway bar to resist body roll on curves. Instead of using sway bar mounting blocks formed from resilient solid blocks of rubbers or the like that are pre-compressed in encircling brackets so as to effectively resist any relative motion between the resilient blocks and the brackets, this improved construction utilizes hanger means for connecting the sway bar to the sprung frame which hanger means permits the sway bar to be displaced vertically for a limited distance in either direction with very little resistance from the resiliently mounted hanger means. After limited free-play movement further displacement of the control arms will be opposed by the full torsional resistance of the sway bar. To compensate for the initial free movement of the sway bar due to its hanger mountings, the sway bar can be made somewhat heavier so that no loss in total resistance to body roll is introduced. In fact, by the use of this improved sway bar mounting means in combination with a heavier sway bar, it is possible to get greater restraint against body roll and still improve the straightaway ride on rough roads.

Another desirable result of this type of sway bar mounting is improved control of wheel hop. Wheel hop is the vibration of the unsprung mass between the wheel and the body suspension, including the sway bar, which vibration is ordinarily in the frequency range of 10 to 12 cycles per second or thereabouts. By lowering the initial resistance to independent wheel motion this free-play sway bar mounting will reduce the wheel hop frequency and thereby reduce the damping requirement. The suspension vibration damper or shock absorber is called upon to control both the body motion and the independent wheel motion and this necessarily involves some compromise. The lower damping requirement for wheel hop resulting from the use of this type of hanger means will mean better control of wheel motion for a given shock absorber resistance setting.

Other objects and advantages of this invention will be more apparent from a reading of the following description taken in connection with the accompanying drawings, wherein:

Fig. 1 is a top plan view of a portion of a motor vehicle chassis that includes independently sprung suspensions for a pair of road wheels which supensions include a stabilizer device embodying this invention;

Fig. 2 is an enlarged fragmentary side elevational view taken from the front end of the suspension shown in Fig. 1 in the direction of the arrow 2;

Fig. 3 is an enlarged side elevational view taken as indicated by the line 3—3 in Fig. 2; and Fig. 4 is an enlarged fragmentary sectional elevational view taken on the line 4—4 of Fig. 2.

The motor vehicle embodying this invention includes a body supporting chassis frame structure C having spaced side rails 10 connected by a cross member 11. Each of a pair of oppositely disposed road wheels 12 is adapted to have rising and falling movement relative to the chassis frame independently of the other road wheels by reason of the wheel support and guide suspension means therefor which is clearly shown in Fig. 2. Each wheel suspension includes a steering knuckle 13 rotatably journalling the associated wheel 12 by the usual spindle 14. Steering knuckle 13 is swingably connected by a kingpin 15, that is generally vertically extending, to the knuckle bracket support element 16 that has articulated or pivot connections at its upper and lower ends respectively with the upper and lower generally laterally extending control arm structures 17 and 18. Each of the upper and lower control arms 17 and 18 has an oscillating or pivotal connection with the chassis frame C. A shock absorber or vibration damper 25 of the telescoping type is secured to each upper control arm structure 17 and to the associated bracket support 16.

Each lower control arm structure 18 is of substantially triangular plan configuration and includes a pair of laterally spaced side components 19. Each control arm side component 19 is formed to provide a portion of substantially channel shaped cross sectional configuration as shown in Fig. 4. Each lower control arm 18 supports a spring seat formation that is designated by the numeral 20. The chassis frame C is springingly supported on each lower control arm 18 by a coil spring 22 that has its lower end engaged with the seat 20 and its upper end mounted in a seat (not shown) formed in the overlying frame cross member 11. A jounce bumper 23 may be mounted on each lower control arm structure 18. The spaced lower control arm side components 19 are interconnected by a reinforcement member 24 that has portions depending beneath the control arm as clearly shown in Figs. 2 and 4.

Each lower control arm structure 18 is pivotally connected by bearings 27 to the chassis frame C for oscillation about a substantially horizontally disposed axis that extends generally longitudinally of the chassis frame as indicated by the axle lines 26 of Fig. 1. Each pivotal connection 27 has portions fixed to the chassis frame cross member 11 and other portions pivotally mounting the side components 19 of the lower control arms 18. A nipple 28 is provided in each connection 27 to receive a suitable device for forcing lubricant into the pivotal connection.

The sway bar 29 comprises an elongated intermediate or bight portion 32 that has outwardly extending lever arm portions 31 formed at each end thereof. The lever arm portions 31 each terminate in an offset end portion 30 that is formed to extend generally parallel to the associated lower control arm forward side component 19. The sway bar end portions 30 are each connected to a forward side component 19 of a lower control arm 18 by a resilient mounting block element 35 that is compressively mounted in a channel-shaped seat provided in the control arm side component 19 (see Fig. 4). Resilient mounting blocks 35 are anchored to their lower control arm seats by means of clamping plates 36 that are fixedly connected to the lower control arm side components 19 by the bolt connectors 37. Each resilient mounting block 35 is formed with a cylindrical bore 38 that matingly receives an end portion 30 of the associated sway bar lever arm 31. Substantial relative movement between the bar ends 30 and the control arms 18 is prevented by the compressed mountings 35.

The ends of the sway bar intermediate portion 32 are each journalled in hanger members 80 that embody the core of this invention. These hanger members 80 are each floatingly supported on a lower flange 10a of one of the chassis frame side members 10 at locations forwardly of the wheel suspension control arms 17, 18. The hangers 80 each comprise an eyebolt composed of a threaded stud part 81 that has its flattened head end 81a connected to a band formed eyelet 82 by the bolts 83. The eyelet 82 is lined with a resilient sleeve 84 to provide a sound insulating bearing for the sway bar bearing portions.

Threaded on the hanger stud 81 are a pair of washer-like seats 85, a pair of cup-shaped resilient mounting blocks 86 and a pair of washer-like caps 87 with one of each of these three elements located on each side of the chassis frame side member flange 10a. The stud 81 of the hanger 80 extends upwardly through an enlarged opening 10b in the side member flange 10a and has a nut 88 mounted on its threaded upper end. When nut 88 is screwed up on the hanger stud 81 the pair of resilient mounting blocks 86 are each sufficiently compressed between the adjacent cap 87 and the side member flange 10a to provide a seal that will prevent foreign matter from entering the void 90 formed between the two opposed cup-shaped mounting blocks 86. The void 90 provides a free-play or floating mounting for the sway bar 29 because it will permit an initial relative movement between the sway bar 29 and the supporting side member flange 10a before one or the other of the pair of resilient mounting blocks 86 is compressed sufficiently to firmly seat against the side member flange 10a. As the sway bar 29 may move relative to the side members 10 for a limited amount, due to the free-play hanger mountings 80, it is thought to be obvious that the lower control arms 18 may also have an initial free-play movement before the control effects of the sway bar 29 are brought into operation by the mounting blocks 86 being compressed against the side member flanges 10a. This initial free-play movement of the sway bar 29 and the control arms 18 with respect to the anchoring side members 10 prevents the transmittal of various road disturbances to the sprung chassis frame C. The particular hanger construction disclosed will permit a certain degree of free-play movement of the hangers 80 in all directions before the resilient mounting blocks 86 become firm against the supporting side member flanges 10a.

In operation the sway bar 29 acts to prevent tilting or sway of the sprung chassis C and in this respect acts on the lower wheel suspension control arms 18 to oppose relative oscillation thereof. For example, as one wheel 12 rises or falls relative to the other, the lower control arm 18 and the bar end portion 30 connected to said one wheel rises or falls and as an incident thereto the bar intermediate portion 32 is torsionally stressed and resists the aforesaid wheel movement by reason of the fact that the other bar lever arm is connected to the lower control arm structure 18 that mounts the opposite road wheel. Thus, if one wheel tends to move relative to the other wheel the sway bar is torsionally stressed so as to resist relative wheel movement. If both wheels tend to move at the same time there will be no tendency for the development of torsional stresses in the sway bar 29 and the suspension will function in a manner similar to one which does not include a sway bar element.

Because of the initial free-play movement resulting from the hanger mountings 80, it is possible to use a somewhat larger diameter sway bar 29 without adversely affecting the deflection characteristics of the spring suspension while at the same time providing increased resistance to body roll at the completion of the free play movement. It has been found that the slight amount of body roll permitted by the free-play movement is practically insignificant as compared to the improved riding characteristic resulting from the elimination of road disturbances that result from the free-play movement.

We claim:

1. In a vehicle including a sprung frame and a pair of supporting road wheels disposed at opposite sides of said frame, suspension means for each of said wheels accommodating rising and falling movement of one wheel independently of the other, each of said wheel suspension means including an arm structure connected with said sprung frame for oscillatory movement about an axis extending generally longitudinally of said frame, a resilient element supporting said sprung frame on each of said arm structures, a stabilizing means for said sprung frame comprising an elongated bar extending transversely of said sprung frame having offset crank portions at opposite ends thereof connected respectively to said arm structures for oscillatory movement therewith, said bar having other portions thereof mounted on said sprung frame by journal means and providing a torsionally active bar portion to resist relative rising and falling movement of one wheel relative to the other, hanger means mounted on said frame supporting the journal means, said hanger means including resilient means arranged to provide an initial high rate of deflection on application of vertically directed forces thereto after which there is an abrupt transition to a low rate of deflection that effectively resists relative vertical movement between the journaled bar portions and the connected frame portions.

2. In a vehicle including a sprung frame and a pair of supporting road wheels disposed at opposite sides of said frame, suspension means for each of said wheels accommodating rising and falling movement of one wheel independently of the other, a resilient element supporting said sprung frame on said suspension means, a stabilizing means for said sprung frame comprising an elongated bar extending transversely of said sprung frame having offset crank portions at opposite ends thereof connected respectively to said suspension means for oscillatory movement therewith, said bar having other portions thereof mounted on said sprung frame by journal means and providing a torsionally active bar portion to resist relative rising and falling movement of one wheel relative to the other, hanger means mounted on said frame supporting the journal means, said hanger means including resilient means arranged to provide an initial high rate of deflection on application of vertically directed forces thereto after which there is an abrupt transition to a low rate of deflection that effectively resists relative vertical movement between the journaled bar portions and the connected frame portions.

3. In a vehicle including a sprung frame and a pair of supporting road wheels disposed at opposite sides of said frame, suspension means for each of said wheels accommodatnig rising and falling movement of one wheel independently of the other, each of said wheel suspension means including an arm structure connected with said sprung frame for oscillatory movement about an axis extending generally longitudinally of said frame, a resilient element supporting said sprung frame on each of said arm structures, a stabilizing means for said sprung frame comprising an elongated bar extending transversely of said sprung frame having offset crank portions at opposite ends thereof connected respectively to said arm structures for oscillatory movement therewith, said bar having other portions thereof mounted on said sprung frame by journal means and providing a torsionally active bar portion to resist relative rising and falling movement of one wheel relative to the other, hanger means being mounted on said frame supporting said journal means and comprising compressible, resilient mounting means connecting the stabilizer bar journaled portions to the frame, said resilient means being arranged to initially resist relative vertical movement between the journaled bar portions and the connected frame portions by resilient portions having a relatively high rate of deflection with other portions of said resilient means having a relatively low rate of deflection becoming abruptly active after a limited amount of relative vertical movement between the resiliently interconnected bar and frame portions to thereafter effectively resist said relative vertical movement.

4. In a vehicle including a sprung frame and a pair of supporting road wheels disposed at opposite sides of said frame, suspension means for each of said wheels accommodating rising and falling movement of one wheel independently of the other, each of said wheel suspension means including an arm structure connected with said sprung frame for oscillatory movement about an axis extending generally longitudinally of said frame, a resilient element supporting said sprung frame on each of said arm structures, a stabilizing means for said sprung frame comprising an elongated bar extending transversely of said sprung frame having offset crank portions at opposite ends thereof connected respectively to said arm structures for oscillatory movement therewith, said bar having other portions thereof mounted on said sprung frame by journal means and providing a torsionally active bar portion to resist relative rising and falling movement of one wheel relative to the other, hanger means mounted on said frame supporting said journal means comprising an eyebolt having the stabilizer bar intermediate portions journalled in the eye thereof loosely mounted in a frame portion with a pair of compressible resilient mounting blocks threaded on the eyebolt shank and arranged on opposed sides of the frame portion, said mounting blocks being arranged to initially resist relative vertical movement between the journaled bar portions and the connected frame portions by resilient portions having a relatively high rate of deflection with other portions of said resilient means having a relatively low rate of deflection becoming abruptly active after a limited amount of relative vertical movement between the resiliently interconnected bar and frame portions to thereafter effectively resist said relative vertical movement.

5. In a vehicle including a sprung frame and a pair of supporting road wheels disposed at opposite sides of said frame, suspension means for each of said wheels accommodating rising and falling movement of one wheel independently of the other, each of said wheel suspension means including an arm structure connected with said sprung frame for oscillatory movement about an axis extending generally longitudinally of said frame, a resilient element supporting said sprung frame on each of said arm structures, an anti-roll stabilizing means for said sprung frame comprising an elongated bar extending transversely of said sprung frame having offset crank portions at opposite end portions thereof each connected respectively to one of said arm structures for oscillatory movement therewith, said bar having intermediate portions thereof mounted on said frame by journal means that support said bar for rotation about a substantially horizontally extending axis, said bar intermediate portions providing a torsionally active bar portion to resist relative rising and falling movement of one wheel relative to the other, said journal means being mounted on said frame by hanger means that permit limited relative vertical movement between the bar and frame, said hanger means comprising an eyebolt mounted on a frame portion for limited relative movement and having stabilizer bar intermediate portions journalled in the eye thereof and a pair of compressible resilient mounting blocks threaded on the eyebolt shank and arranged on opposed sides of said frame portion, said mounting blocks being formed with voids therein arranged to provide for a limited amount of substantially unopposed vertical movement of the stabilizer bar relative to the frame before the blocks are sufficiently compressed to become solid and provide a mounting means whereby the torsion bar is firmly seated on the frame and the torsional stress control effect of the bar brought into stabilizing operation.

6. In a motor vehicle suspension comprising a pair of oppositely disposed, independently sprung road wheels each of which is mounted on a control arm that is connected to a vehicle frame member by means providing for relative movement between the supported wheel and the frame member, a torsion bar stabilizer connected between the wheel control arms for movement therewith, and means journaling the torsion bar stabilizer on the frame member comprising an eyebolt type of hanger mounted on said frame member for limited relative movement, said hanger having portions of said stabilizer bar journalled in the eye thereof, the stem of said eyebolt being mounted on said frame member by variable cross-section resilient means arranged to initially resist relative vertical movement between the eyebolt and frame member by portions of the resilient means of reduced cross-section having a high rate of deflection with other portions of said resilient means of increased cross section becoming effective after a predetermined relative vertical movement between the bar and frame member to provide an abrupt reduction in deflection rate that effectively resists the relative vertical movement between the hanger connected bar and frame member.

References Cited in the file of this patent

UNITED STATES PATENTS

| | | |
|---|---|---|
| 1,066,164 | Thompson | July 1, 1913 |
| 2,155,867 | McIntyre | Apr. 25, 1939 |
| 2,517,611 | Utz | Aug. 8, 1950 |

FOREIGN PATENTS

| | | |
|---|---|---|
| 775,996 | France | Oct. 22, 1934 |